(12) United States Patent
Dubois

(10) Patent No.: US 6,433,330 B1
(45) Date of Patent: Aug. 13, 2002

(54) SUN OPTICAL LIMITATION ILLUMINATION DETECTOR (SOLID)

(75) Inventor: Jacques Dubois, Neufchatel (CA)

(73) Assignee: Her Majesty the Queen in right of Canada, as represented by the Minister of National Defence, Ottawa (CA)

( * ) Notice: Subject to any disclaimer, the term of this patent is extended or adjusted under 35 U.S.C. 154(b) by 13 days.

(21) Appl. No.: 09/584,720

(22) Filed: Jun. 1, 2000

(51) Int. Cl.[7] .................................................. G01J 3/50
(52) U.S. Cl. ........................................ 250/226; 250/229
(58) Field of Search ............................. 250/206.2, 226, 250/229; 356/147, 138, 416, 141.2, 141.3, 152.1, 139.04; 359/189, 193, 601, 613, 614, 227, 229

(56) References Cited

U.S. PATENT DOCUMENTS

| | | | |
|---|---|---|---|
| 4,233,501 A | * 11/1980 | Strother | 250/229 |
| 4,737,028 A | 4/1988 | Smith | |
| 4,806,747 A | 2/1989 | Dunavan et al. | |
| 4,857,721 A | 8/1989 | Dunavan et al. | |
| 4,880,305 A | 11/1989 | Salt | |
| 5,017,006 A | 5/1991 | Poisel et al. | |
| 5,151,585 A | 9/1992 | Siebert | |
| 5,162,643 A | * 11/1992 | Currie | 250/206.1 |
| 5,220,409 A | 6/1993 | Bures | |
| 5,227,859 A | 7/1993 | Leib et al. | |
| 5,280,167 A | 1/1994 | Dubois | |
| 5,428,215 A | 6/1995 | Dubois et al. | |
| 5,519,205 A | * 5/1996 | Rostoker | 250/208.1 |
| 5,686,722 A | * 11/1997 | Dubois et al. | 250/226 |
| 5,729,010 A | * 3/1998 | Pinkus et al. | 250/214 VT |
| 5,771,092 A | * 6/1998 | Dubois et al. | 356/147 |
| 5,872,623 A | * 2/1999 | Stabile et al. | 356/73 |
| 5,923,457 A | * 7/1999 | Byker et al. | 359/271 |
| 5,953,082 A | * 9/1999 | Butcher | 349/13 |
| 5,966,227 A | * 10/1999 | Dubois et al. | 359/170 |

FOREIGN PATENT DOCUMENTS

| | | |
|---|---|---|
| GB | 2 191 056 A | 12/1987 |
| WO | WO 97/22904 | 6/1997 |

* cited by examiner

*Primary Examiner*—Robert H. Kim
*Assistant Examiner*—Chih-Cheng Kao
(74) *Attorney, Agent, or Firm*—Larson & Taylor, PLC

(57) ABSTRACT

An imaging system for obtaining an image of a field-of-view where high levels of light from an extraneous source may be present at one area and low levels of light present at other areas in the field-of-view. The imaging system has a lens to focus an image of the field-of-view onto a surface of a photodetector and an optical limiter is located between the lens and the photodetector. The optical limiter limits transmission of the high levels of light at areas onto which those are focussed by the lens but remains transmissive to the low levels of light at other areas. The imaging system is particularly intended for use in laser warning receivers where sunlight may be focussed on the optical limiter and blocked at the particularly area on which it is focussed, the optical limiter remaining transmissive to laser beams, even if intense, at locations other than where the sunlight is focussed allowing laser beams to be detected by the photodetector.

5 Claims, 3 Drawing Sheets

SUN OPTICAL LIMITATION ILLUMINATION DETECTOR (SOLID)

FIELD OF THE INVENTION

The present invention relates, in general, to imaging systems for low level radiation sources where high levels of extraneous wide-band light may be present in the field-of-view and, in particular, to Laser Warning Receivers (LWR) for protecting military platforms against laser guided weapons by detecting and locating very low power laser sources associated with those weapons when light from other sources, such as the sun, may be present in the same field-of-view.

BACKGROUND OF THE INVENTION

Many research laboratories and manufacturers around the world are presently involved in the development of Laser Warning Receivers (LWR) for the purpose of protecting military platforms against laser guided weapons by detecting, identifying and locating laser sources associated with those weapons. One type of LWR is described in U.S. Pat. No. 5,428,215 by J. Dubois et al. The detection threshold of most LWRs are limited, however, by extraneous light from other sources and particularly by the high level of background radiation generated by the sun. The sun is almost always the limiting factor for highly sensitive light detection systems required to detect and locate very low power laser sources such as associated with a Laser Beam Rider (LBR) where the laser is aimed at a target to guide a missile towards that target. The detectors for these types of very low power laser sources still have a limited capability because the signal they produce is often buried in the background radiation. It is possible to reject part of the sun's radiation through optical filtering but this is at the expense of a narrower optical bandwidth covered by that LWR. Even when using optical filters, the ultimate limit in the detection threshold is the residual sun radiation.

The sun is also a problem for other imaging systems, such as video cameras when the sun is in the field-of-view of the image sensor. This results in it being very difficult to balance the brightness of the image and a lot of information in the image is lost because of the very bright spot of light generated by the sun at one location in that image.

Various techniques already exist for the detection of laser sources, some of which use narrow-band optical filters, multiple narrow field-of-view (FOV) detectors or multiple lenses combined with a detector array to handle the problem of radiation from the sun during the detection of such sources. LWRs based on these types of approaches succeed in reducing the effects of the sun's radiation but, most of the time, this leads to very costly and bulky devices. One disadvantage of using multiple lenses combined with a detector array is that a large number of detection channels result. The use of filters has limitations due to the large number of them required for a successful rejection of radiation from the sun.

SUMMARY OF THE INVENTION

It is an object of the present invention to provide a light detection system capable of discriminating between high levels of radiation from bright extraneous sources and light from other sources and of attenuating the high levels to allow the detection system to detect the light from other sources.

An imaging system for a field-of-view where high levels of light from an extraneous source may be present at one area in the field-of-view, according to one embodiment of the present invention, has means to focus an image of the field-of-view onto a surface of a photodetector, an optical limiter being located between the means to focus and the photodetector, the optical limiter having means to limit transmission of said high levels of wide-band light received from the extraneous source at a particular area where the high levels of light are directed onto the optical limiter by the means to focus, the optical limiter remaining transmissive to light received from areas in the field-of-view outside of said particular area allowing light received from outside of said one area to be focused onto the photodetector.

A light detection system for detecting laser beams where high levels of wide-band light from an extraneous source may be present at one area in the system's field-of-view, according to a further embodiment of the invention, has means to focus an image of the field-of-view onto a surface of a photodetector, an optical limiter being located between the means to focus and the photodetector, the optical limiter having means to limit transmission of said high levels of wide-band light received from the extraneous source at a particular area where the high levels are directed onto the optical limiter by the means to focus, the optical limiter remaining transmissive to light received from areas in the field-of-view outside of said particular area allowing any laser beam received from the field-of-view to be focussed onto the photodetector.

BRIEF DESCRIPTION OF THE DRAWINGS

The invention will now be described in more detail with reference to the accompanying drawings, in which.

DETAILED DESCRIPTION OF THE PREFERRED EMBODIMENTS

The present invention is directed to an imaging system capable of discriminating between high levels of radiation from bright extraneous sources and low levels of radiation from sources to be detected and of attenuating the high levels at the image detector to allow detection of the low level sources. The present invention is, in particular, directed to Sun Optical Limitation Illumination Detectors (SOLID) which allow Laser Warning Receivers (LWRs) to detect very low level laser sources, those associated with Laser Beam Rider (LBR) weapons, even when bright wide-band light from the sun is present in the detectors field-of-view (FOV).

Figure 1:
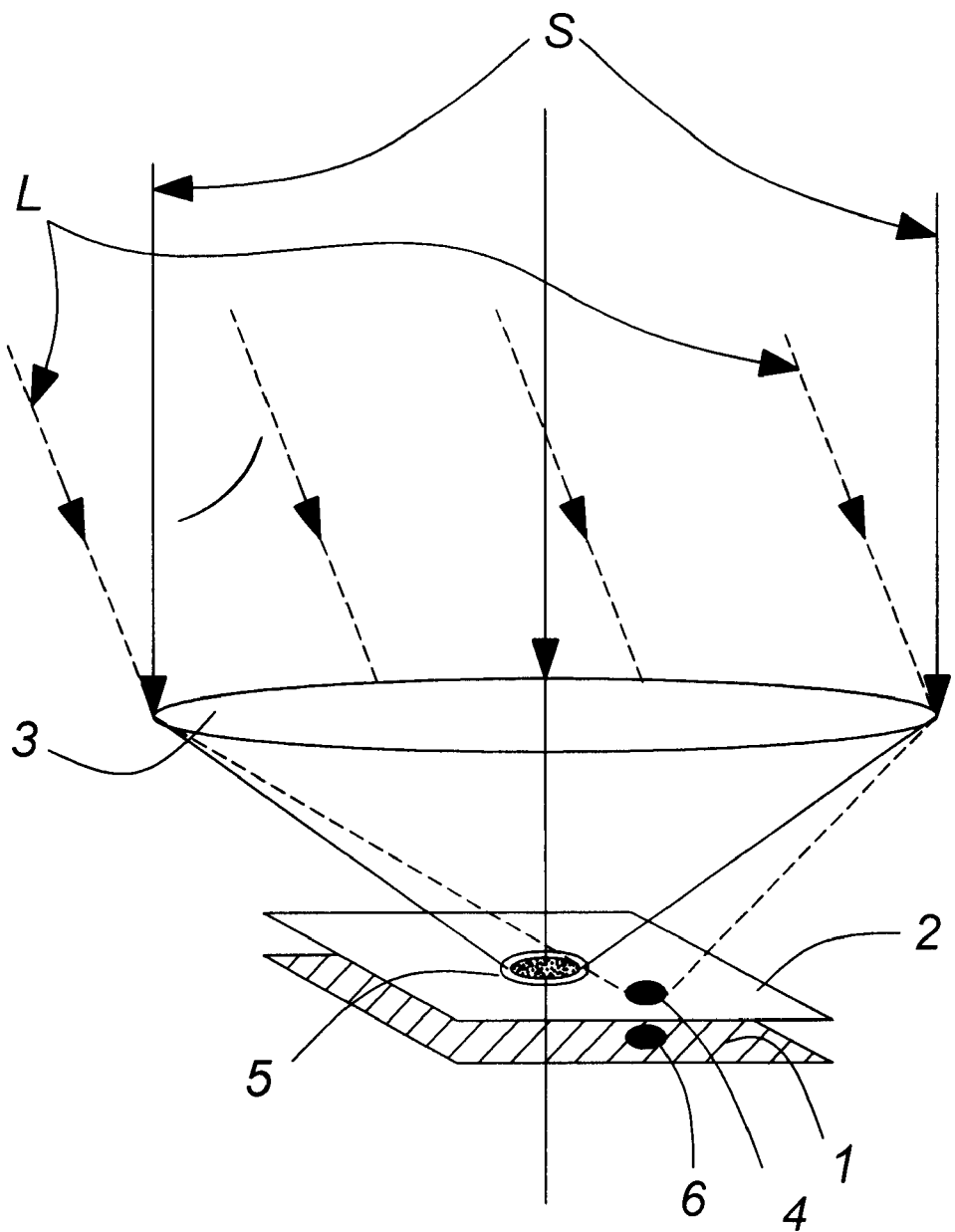
FIG. 1 illustrates a Sun Optical Limitation Illumination Detector (SOLID) according to one embodiment of the present invention.

A basic concept of a SOLID detection module according to the present invention for a LWR detector is illustrated in the embodiments shown in FIG. 1. In FIG. 1, the module consists of a photodetector 1, or any other type of light sensor, on which is deposited an optical limiter 2 and a lens 3 is used to focus light from sources in the field-of-view of the lens and direct that light onto the limiter 2. Assuming that the module illustrated in FIG. 1 is part of a LWR mounted on a military platform, such as an aircraft, it would operate by laser radiation L from a laser source, such as a LBR, being collected by lens 3 and focussed as a small light spot 4 on the optical limiter surface 2 when a laser source associated with a LBR is aimed at the aircraft to guide a missile towards it. The optical limiter 2 is located just above the detector's 1 surface and the optical limiter 2 for this particular module is one selected to react to sunlight, which contains a full spectrum of light, but will not react to the wavelength generated from a narrow band laser source that is to be detected. The laser light that is focussed on spot 4 will, as a result, be transmitted through optical limiter 2 with very little attenuation and produce a 10 laser light spot 6 on the surface of photodetector 1. If this type of module is used in the presence of the sun, the sunlight S will also be focussed as a light spot 5 on the optical limiter's 2 surface. The spot 5 on which light from the sun is focussed would normally be at a different location on the surface of limiter 2 from that on which the laser spot 4 appears since the sunlight and light from the laser would generally arrive at different angles. The focussing of the sunlight onto spot 5 of the optical limiter's 2 surface will cause the limiter 2 to react and to strongly attenuate the radiation from the sun locally but will not react to the laser's wavelength or where the laser is focussed on the limiter's 2 surface. This phenomenon is possible because the sun contains a full spectrum of optical radiation whereas lasers normally emit in a single narrow optical band. Suitably choosing the wavelength at which the optical limiter 2 will react results in it being possible to specifically attenuate radiation received from the sun and not radiation from lasers which emits in a certain, narrow optical band.

A typical example of an optical limiter 2 which may be used is the photochromic process used in prescription glasses where the UV content of sunlight is used to trigger the optical attenuation phenomenon of the glasses in the visible range of the spectrum. The attenuation process is relatively slow to initiate for prescription glasses, but, the reaction time can be dramatically reduced by using the lens 3 to focus the sunlight S onto spot 5.

Figure 2:
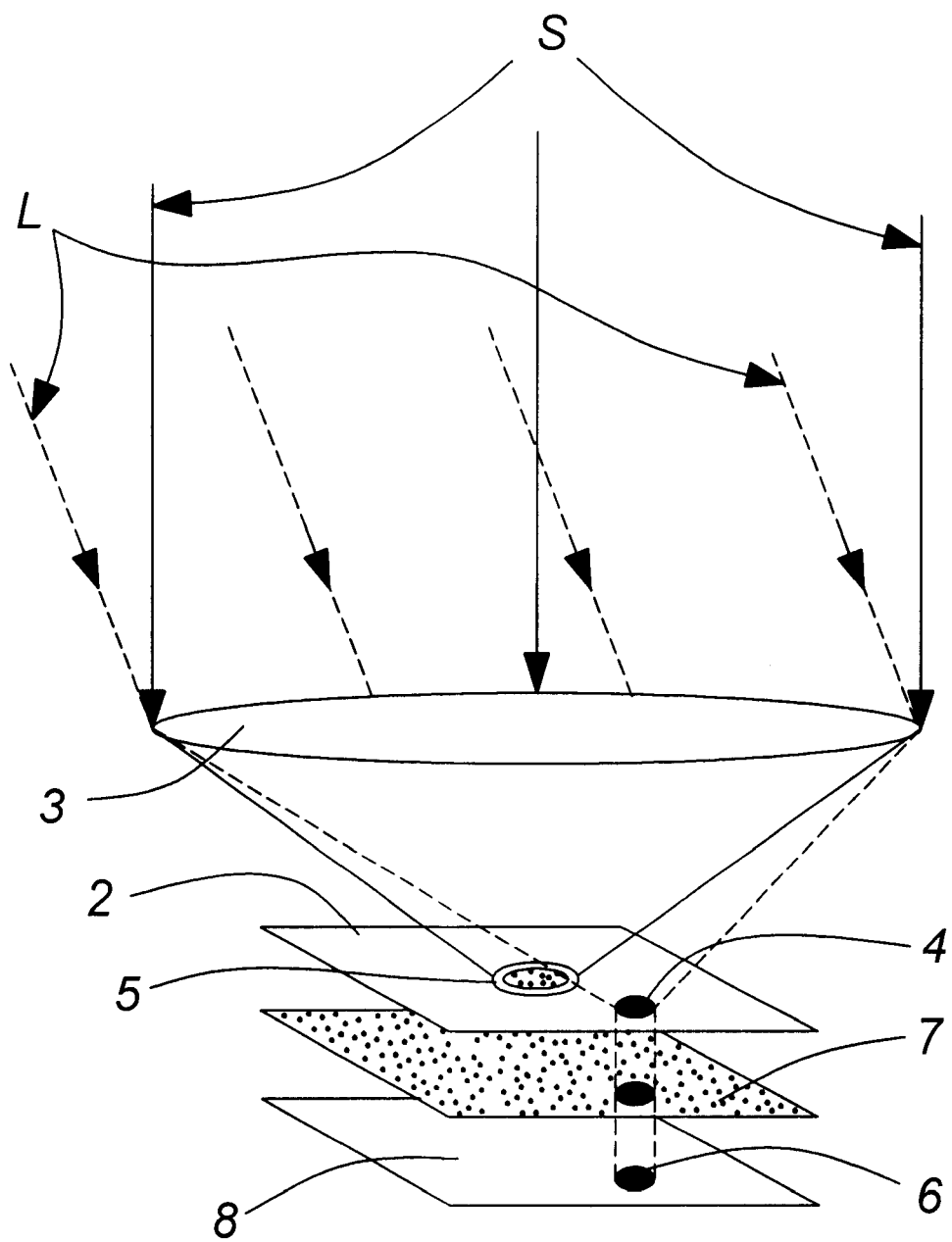
FIG. 2 illustrates a detector (SOLID) according to another embodiment of the present invention.

In a further embodiment of the invention, an optical filter 7, as illustrated in FIG. 2, is added between the photodetector and the optical limiter 2 layers to further reduce the residual sun background radiation. In the FIG. 2 embodiment, the photodetector 1 of FIG. 1 has been replaced by a position sensing device 8 such as a CCD detector. A position sensing device 8 is one that generates a signal at the position of a light spot on its surface measured along the X and Y axis. Therefore, it is possible to measure the angle of arrival of the radiation through a calibration of the laser spot 4 displacement as a function of the focal length of the lens. The laser radiation, in this embodiment, is again focussed on a spot 4 of the optical limiter where it is transmitted through the optical limiter 2 and the optical filter 7 to produce a laser spot 6 on the position sensing photodetector 8. The angle-of-arrival of radiation L from a laser source (not shown) can then be determined from the position of the laser spot 6 on the position sensing photodetector 8.

Figure 3:
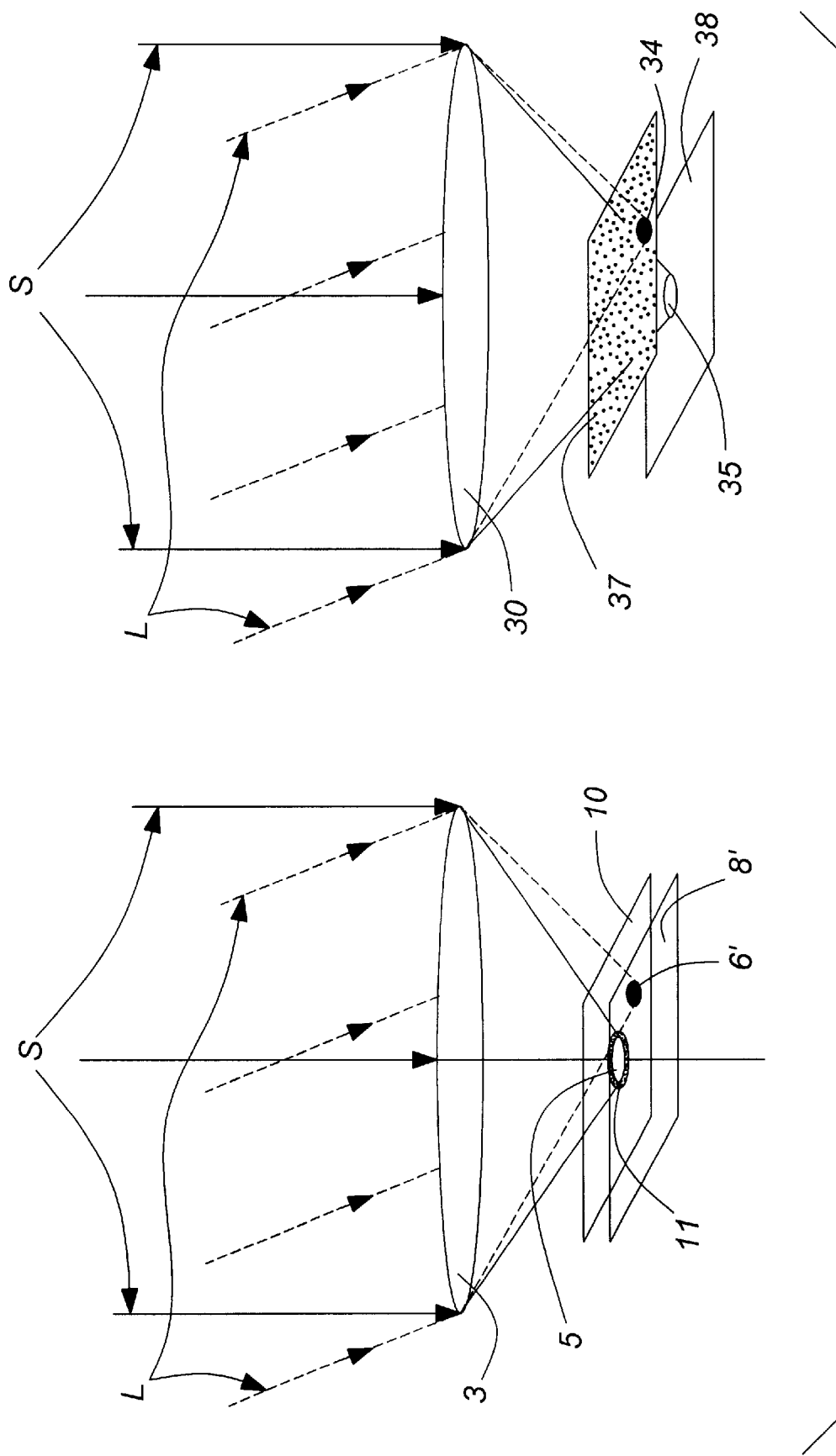
FIG. 3 illustrates a still further embodiment of a (SOLID) detector according to the present invention.

FIG. 3 illustrates a further embodiment of a SOLID detector according to the present invention wherein the optical limiter 2 shown in FIG. 2 has been replaced by a liquid crystal display (LCD) 10 onto which the laser radiation is focussed by lens 3 at laser spot 6'. A position sensing photodetector 8' is located next to and below LCD 10 and that laser spot (4 in FIG. 2) is transmitted through the LCD onto the position sensing photodetector 8' to a laser spot 6'. The position sensing detector, i.e. a CCD image sensor, can then detect the laser beam and the angle-of-arrival of the laser radiation determined from the position of that laser spot 6' on detector 8'. In this embodiment, a second parallel lens 30 (similar to lens 3) focuses the received laser radiation onto a spot 34 of a second optical filter 37 which blocks the laser radiation wavelength but which has an optical bandwidth to transmit radiation from the sun S. The radiation S from the sun is then focussed by lens 30 onto a second position sensing photodetector 38. The position of the sun spot 35 which lens 30 produces on the position sensing photodetector 38 is then determined and a dark (opaque) spot 11 is generated at the corresponding location on the LCD 10 where that sunlight would be focussed by lens 3. The opaque spot 11 then locally attenuates the sunlight transmitted through LCD 10 and blocks it from reaching the position sensing photodetector 8'. The position sensing photodetector 8' can then determine the position of laser spot 6' and the angle-of-arrival of the laser radiation L without the detection of laser radiation L being lost in the background radiation from the sun. Although lens 30 was similar to lens 3 in the FIG. 3 embodiment, other types of optical arrangements could be used to determine the position of spot 5, where the sunlight S is focussed by lens 3 on the LCD, and used to darken that area of the LCD 10 so as to prevent, or at least limit, the sunlight S from reaching the position sensing detector 8'. This optical arrangement can also be used in video cameras to specifically 20 attenuate the effects of the sun on a charge-coupled device (CCD) image sensor where a picture from the camera's lens is focussed, the sun being in the same field-of-view of the lens.

Various modifications may be made to the described embodiments without departing from the spirit and scope of the invention as defined in the appended claims. The described embodiments, for instance, have been directed to detection of a low level laser beam but by selecting an optical limiter to react to wavelengths outside of an optical bandwidth of interest, a narrow bandwidth light source of interest from a laser will be transmitted through the optical limiter and detected even when it is an intense source. The performance of the High Angular Resolution Laser Irradiation Detector described in U.S. Pat. No. 5,428,215 by J. Dubois et al, for example, could be substantially increased by adding a cylindrical lens on top of that type of detector and combine it with an optical limiter, as described above, positioned over the photodetector array. This would result in a much more sensitive detection unit through specific local attenuation of the sun's radiation.

The embodiments of the invention in which an exclusive property or privilege is claimed are defined as follows:

1. A light detection system for detecting laser beams where high levels of light from an extraneous source may be present at one area in the system's field-of-view, the light detection system comprising means to focus an image of the field-of-view onto a surface of a photodetector, an optical limiter being located between the means to focus and the photodetector, the optical limiter having means to limit transmission of said high levels of light received from the extraneous source at a particular area where the high levels are directed onto the optical limiter by the means to focus, the optical limiter remaining transmissive to light received from areas in the field-of-view outside of said particular area and allowing any laser beam received from the field-of-view outside of the particular area to be focussed onto the photodetector, said photodetector comprising a position sensing photodetector from which the position of any laser beam focussed onto the photodetector can be determined and an angle-of-arrival of such a laser beam can be determined from said position, and said optical limiter comprising a liquid crystal display (LCD) and said system further including means to determine the location on the LCD of an area onto which the high levels of light are directed by the means to focus, the system further including means to activate the LCD to place the LCD in an opaque mode at the area where said high levels of light are directed.

2. A light detection system as defined in claim 1, wherein an optical filter transmissive to laser beams to be detected is located between the optical limiter and position sensing photodetector.

3. A light detection system as defined in claim 2, wherein the position sensing photodetector is a charge coupled device imaging sensor that generates a signal at the position on its surface where any laser beam is focussed.

4. A light detection system as defined in claim 1, wherein the means to focus comprises a first lens and the means to determine the location on the LCD of said area comprises a second lens having a similar field-of-view as the first lens, the second lens focussing said similar field-of-view onto a second position sensing photodetector where the location at which said high levels of light is focussed can be determined, the imaging system further including means to place the LCD into an opaque mode at an area corresponding to the location determined by the second position sensing photodetector.

5. A light detection system as defined in claim 4, wherein an optical filter opaque to laser beams to be detected is located between the second lens and the second position sensing photodetector, the optical filter being transmissive to radiation from the sun.

\* \* \* \* \*